Figure 1:
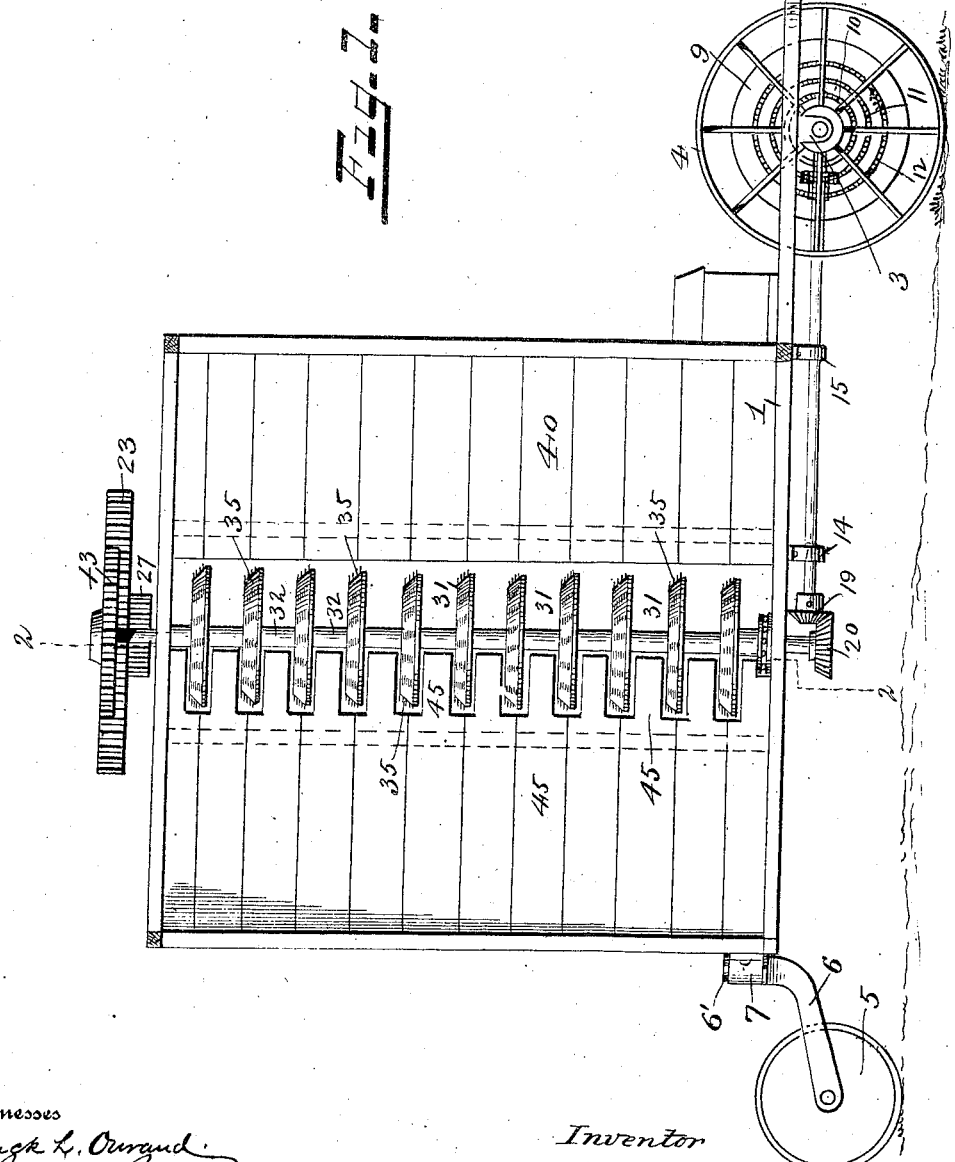

No. 844,331. PATENTED FEB. 19, 1907.
O. H. P. CORNELL.
COTTON PICKER.
APPLICATION FILED APR. 4, 1905. RENEWED NOV. 17, 1906.

4 SHEETS—SHEET 1

Witnesses
Franck L. Ourand
W. Parker Reinohl

Inventor
Oliver H. P. Cornell
By D. P. Reinohl, Attorney

No. 844,331. PATENTED FEB. 19, 1907.
O. H. P. CORNELL.
COTTON PICKER.
APPLICATION FILED APR. 4, 1905. RENEWED NOV. 17, 1906.
4 SHEETS—SHEET 2.
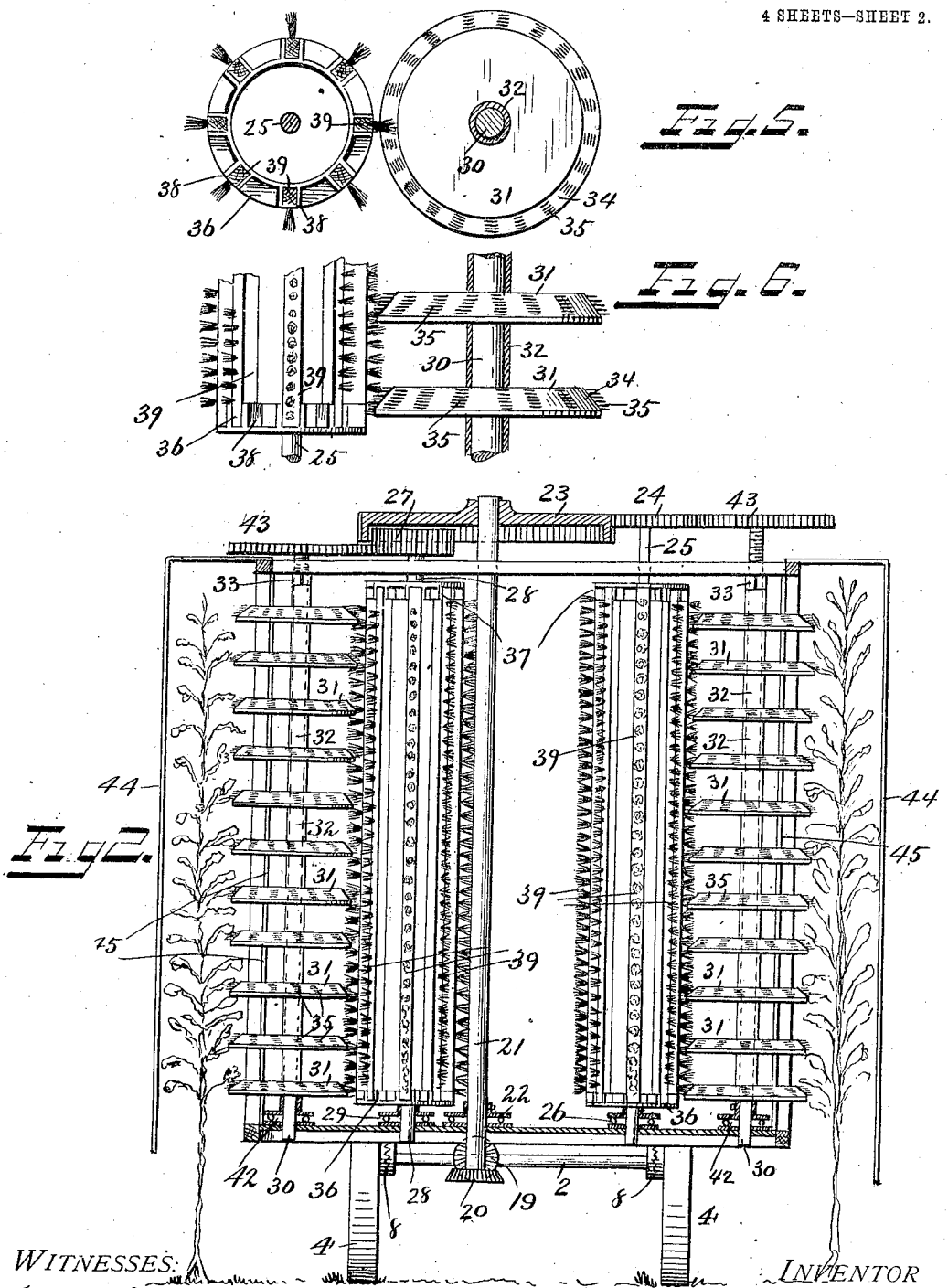
WITNESSES:
Franck L. Onrand.
W. Parker Reinohl.
INVENTOR
Oliver H. P. Cornell.
BY D. J. Reinohl.
Attorney No. 844,331. PATENTED FEB. 19, 1907.
O. H. P. CORNELL.
COTTON PICKER.
APPLICATION FILED APR. 4, 1905. RENEWED NOV. 17, 1906.
4 SHEETS—SHEET 3.
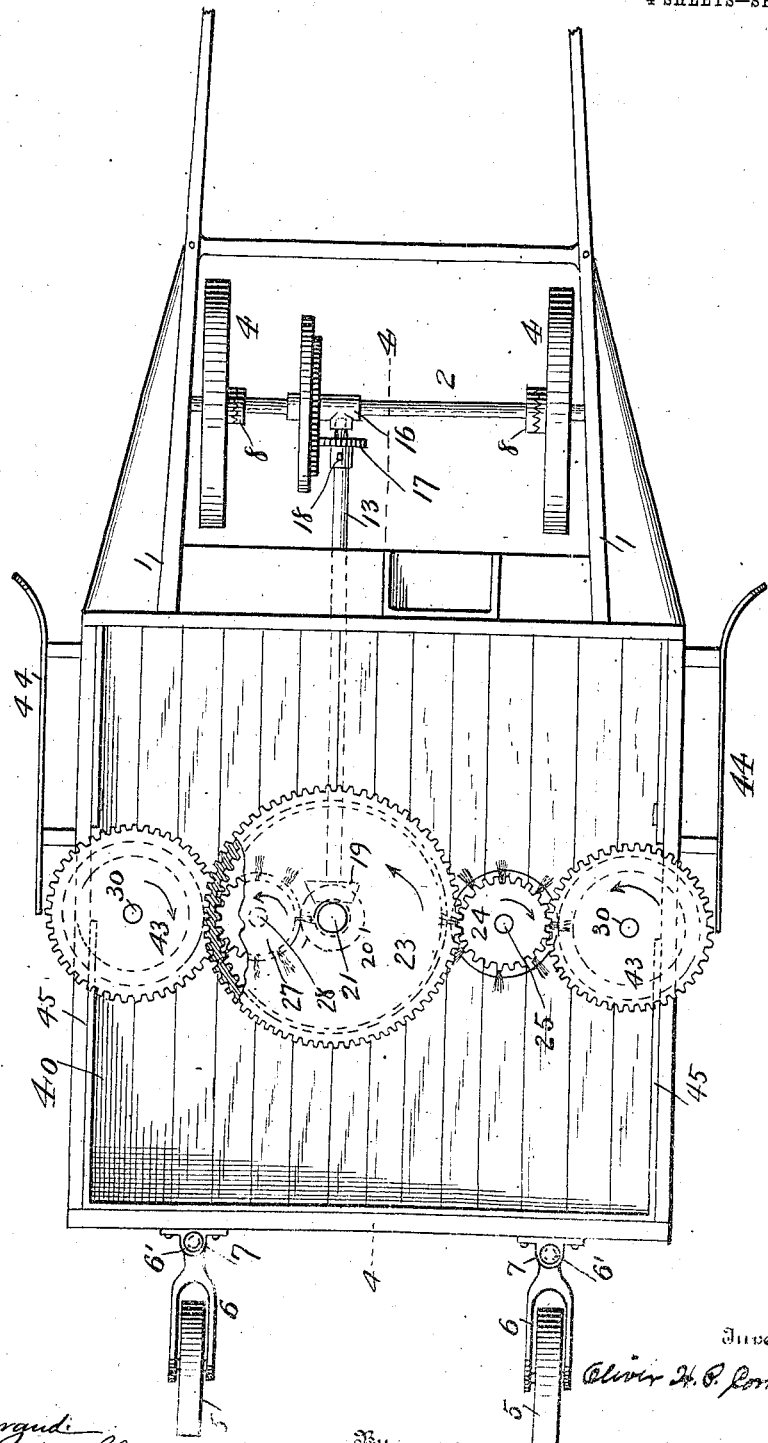

No. 844,331. PATENTED FEB. 19, 1907.
O. H. P. CORNELL.
COTTON PICKER.
APPLICATION FILED APR. 4, 1905. RENEWED NOV. 17, 1906.
4 SHEETS—SHEET 4.
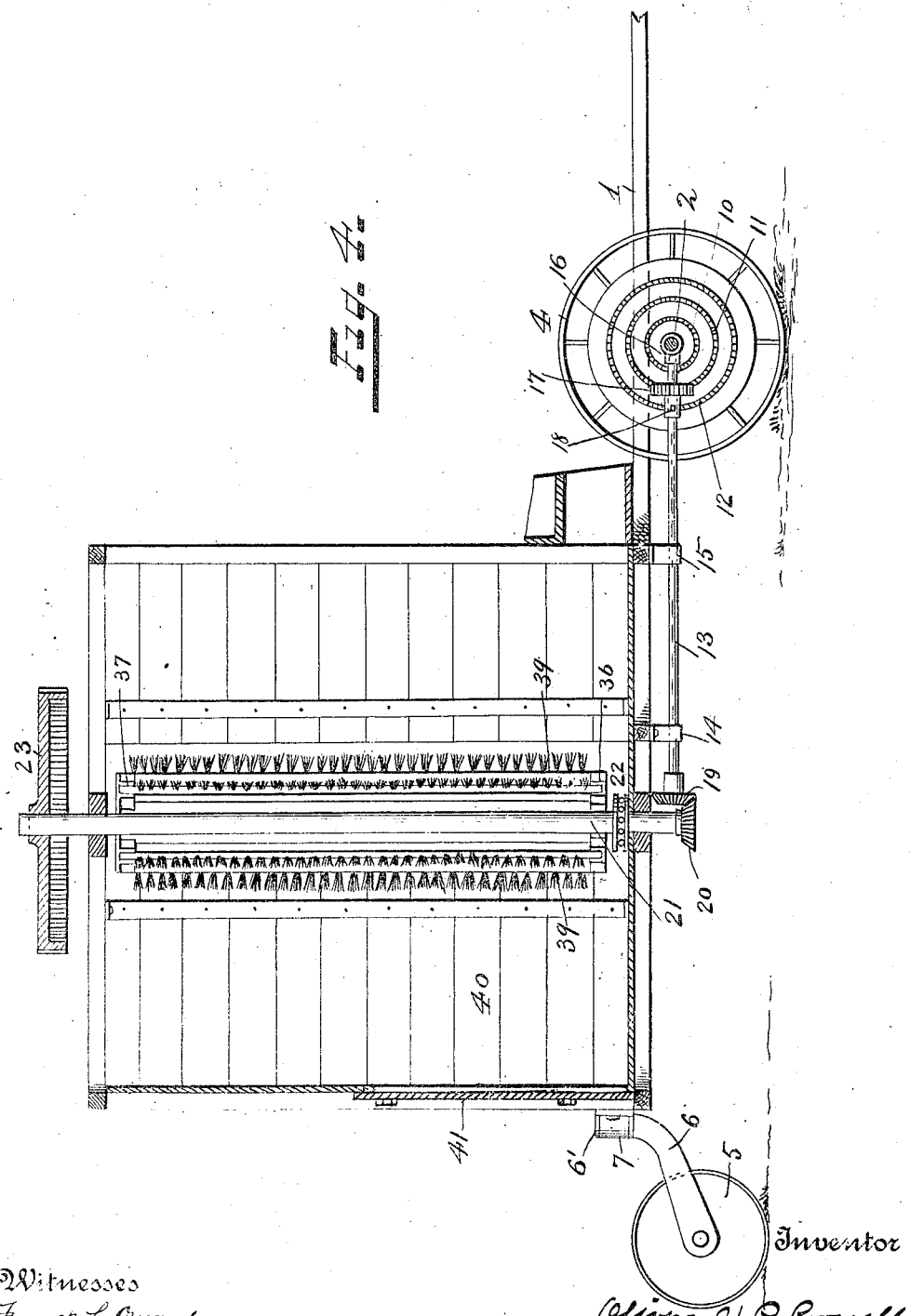
Witnesses
Franck L. Ourand
W. Parker Reindell
Inventor
Oliver H. P. Cornell
by D. C. Reinohl
Attorney

UNITED STATES PATENT OFFICE.

OLIVER H. P. CORNELL, OF ATLANTA, GEORGIA, ASSIGNOR OF ONE-HALF TO CHARLES H. BLAIR AND HERBERT G. OGDEN, JR., OF NEW YORK, N. Y.

COTTON-PICKER.

No. 844,331.     Specification of Letters Patent.     Patented Feb. 19, 1907.

Application filed April 4, 1905. Renewed November 17, 1906. Serial No. 343,930.

*To all whom it may concern:*

Be it known that I, OLIVER H. P. CORNELL, a citizen of the United States, residing at Atlanta, in the county of Fulton and State of Georgia, have invented certain new and useful Improvements in Cotton-Pickers; and I do hereby declare the following to be a full, clear, and exact description of the invention, such as will enable others skilled in the art to which it appertains to make and use the same.

My invention relates to cotton-pickers or harvesters, has for its object a machine which can be put into operation in a field during the different stages of maturity of the cotton and pick the ripened bolls without disturbing the unripe bolls or injuring the plant; and the invention consists in certain improvements in construction which will be fully disclosed in the following specification and claims.

In the accompanying drawings, which form part of this specification, Figure 1 represents a side elevation of my improved cotton-picker; Fig. 2, a vertical transverse section on line 2 2, Fig. 1; Fig. 3, a top plan view partly in section; Fig. 4, a vertical longitudinal section on line 4 4, Fig. 3; Fig. 5, an enlarged detail showing one of the picker-disks in plan and its clearing-brush in horizontal section; and Fig. 6, a like view showing two picker-disks and their shaft in elevation, their separating-thimbles in section, and the clearing-brush in elevation.

Reference being had to the drawings and the designating characters thereon, the numeral 1 indicates the frame of a vehicle on which the cotton-picker is supported; 2, the front axle supported in hangers 3, secured to the frame; 4 4, the front wheels, and 5 5 the rear wheels, which are connected to the structure by a bifurcated support 6, having a pivot 6' at their upper ends, which engage bearings 7 to swing laterally to accommodate themselves to any position or direction in which the vehicle may travel. The front wheels are connected to the axle 2 by suitable clutches, as 8, to cause the axle to revolve in unison with the wheels 4.

Secured to the axle 2 is a graduated spur-wheel 9, having a plurality of toothed members 10-11 12 of different diameters and concentrically arranged, and on one end of a shaft 13, supported in hangers 14 15 and in a socket-bearing 16, on the axle 2, is a pinion 17, adjustably secured by a set-screw 18 to engage either of the members 10, 11, or 12, according to the speed required or desired to be imparted to the picker-disks and the cleaning-brushes.

19 is a bevel gear-wheel on the inner end of the shaft 13, which engages a like wheel 20 on the lower end of a vertical shaft 21, supported on a ball-bearing 22, and to whose upper end is secured an externally and internally toothed gear-wheel 23, whose external teeth are engaged by a gear-wheel 24 on the upper end of a shaft 25, which supports one of the cleaning-brushes, and which shaft is supported on a ball-bearing 26, and the internal teeth are engaged by a gear-wheel 27 on the upper end of a shaft 28, which supports the other cleaning-brush, and said shaft is supported on a ball-bearing 29.

30 30 are shafts upon which are mounted picker-disks 31 for removing cotton from bolls.

Cotton, as is well known, begins to ripen or mature from the lower end of the plant upward and requires several harvestings or pickings to gather all the cotton from the plant. It is therefore very desirable that the upper portion of the plant containing unripe bolls and blooms shall not be disturbed or injured in removing the cotton from the lower or ripened bolls. To accomplish this, the picker-disks 31 are detachably mounted on the shafts 30, are separated by thimbles 32 between the disks, and secured in position by a clamping-nut 33, which bears upon the thimble above the upper disk.

During the first harvesting or picking of cotton the upper picker-disks are removed from the machine to suit the height of the ripened cotton, when sleeves of suitable length are put upon the shafts 30 and the nuts 33 tightened to secure the disks remaining on the shafts.

The picker-disks 31 are provided with plain upper and lower surfaces to prevent cotton adhering to them and with a concentric and inclined picking or working surface 34, provided with teeth 35, inclined in the direction of revolution of the disks to engage the cotton in the ripened and open bolls and remove it therefrom.

The cleaning-brushes are preferably made with heads 36 37, having pockets 38 to receive the separate members 39 and securely hold them. These brush members are of the class of brushes used in cotton-gins and engage the picking-surface 34 of the disks 31 and brush off the cotton and throw it into the receptacle 40 on the vehicle, from which it is removed at suitable intervals through a door 41 in the rear end of the receptacle.

The shafts 30 are supported on ball-bearings 42, and at their upper end are gear-wheels 43, one of which engages with wheel 24 and the other with wheel 27 to revolve the picker-disks 31 at a slower rate of speed than the cleaning-brushes and in the opposite direction, as indicated by arrows in Fig. 3.

44 indicates gatherers on the sides of the machine to draw the cotton-plants in toward the picker-disks 31 as the machine is advancing, and between the disks are finger-guards 45 to prevent the cotton being thrown outward away from the receptacle 40 by the cleaning-brushes.

Having thus fully described my invention, what I claim is—

1. A cotton-picker having a vertical shaft provided with a plurality of revoluble picker-disks in different horizontal planes, detachably secured on the shaft, and detached thimbles between said disks, said disks and thimbles being secured on the shaft by a suitable clamping device; in combination with revoluble brushes engaging said disks to remove cotton therefrom.

2. A cotton-picker provided with a plurality of revoluble picker-disks having plain upper surfaces and inclined surfaces on the upper side of the disks provided with metallic teeth; in combination with revoluble brushes engaging the inclined surfaces of the disks.

3. A cotton-picker provided with a plurality of detachable picker-disks in different horizontal planes, a shaft supporting the disks, and removable thimbles separating the disks; in combination with revoluble brushes engaging said disks.

4. A cotton-picker provided with a plurality of picker-disks detachably secured in different horizontal planes, and a clearing-brush having separate members secured in heads at each end of the brush.

5. A cotton-picker provided with a plurality of picker-disks detachably secured in different horizontal planes, guards between the disks, and a clearing-brush common to all the disks and provided with heads at the ends in which separate members of the brush are secured.

6. A cotton-picker provided with a plurality of picker-disks detachably secured in different horizontal planes, clearing-brushes engaging the working surface of said disks, guards between the disks and gatherers on the sides to direct the plants and bolls toward the picking-disks.

7. In a cotton-picker, the combination of a revoluble vertical shaft provided with a plurality of picker-disks having teeth and a vertically-arranged revoluble substantially cylindrical brush coöperating with all of said picker-disks.

8. In a cotton-picker, the combination of a revoluble shaft and a series of revoluble picker-disks in different horizontal planes detachably mounted on said shaft, and a vertically-arranged substantially cylindrical revoluble brush coöperating with all of said picker-disks.

In testimony whereof I affix my signature in presence of two witnesses.

OLIVER H. P. CORNELL.

Witnesses:
J. L. ANDERSON,
LEWIS W. THOMAS.